United States Patent [19]

Pegg

[11] 3,856,593

[45] Dec. 24, 1974

[54] EXPANDED POROUS SUBSTRATE FOR FIBROUS GRAPHITE STRUCTURE

[75] Inventor: Ronald L. Pegg, Costa Mesa, Calif.

[73] Assignee: Haveg Industries, Inc., Wilmington, Del.

[22] Filed: May 23, 1972

[21] Appl. No.: 256,070

[52] U.S. Cl............ 156/60, 117/46 CC, 117/46 CG, 264/29
[51] Int. Cl............................................... B29c 25/00
[58] Field of Search ..... 264/29; 117/46 CC, 46 CG; 156/60

[56] References Cited
UNITED STATES PATENTS

| | | | |
|---|---|---|---|
| 3,216,195 | 11/1965 | Keon | 117/46 CG |
| 3,462,289 | 8/1969 | Rohl et al. | 117/46 CB |
| 3,723,157 | 3/1973 | Druin | 117/46 CB |

Primary Examiner—Edward G. Whitby
Attorney, Agent, or Firm—Michael B. Keehan

[57] ABSTRACT

A fibrous graphite unit is made by taking plies of B-stage impregnated cloth of at least 80 percent carbon assay (carbon or graphite cloth) and stacking one on another and debulking the same to form a substrate precursor unit. The resin is then cured (converted to the C-stage) in a free standing state (atomspheric pressure) whereby the resin expands to form an expanded porous substrate. The expanded unit is then either pyrolyzed, carbonized, or graphitized, depending upon desired results. The unit is also infiltrated with pyrolytic carbon which may be converted to pyrolytic graphite.

11 Claims, No Drawings

EXPANDED POROUS SUBSTRATE FOR FIBROUS GRAPHITE STRUCTURE

Reinforced plastic composite units and massive graphite units have been the two basic material types capable of withstanding rocket nozzles and reentry environments. Each of these two types of materials have advantages and limitations but have been successfully developed on innumerable space and missile systems for thermal protection. The reinforced plastic composite unit is produced by taking plies of B-stage phenol-formaldehyde resin impregnated carbon or graphite cloth and laying the plies upon one another to form a unit, compressing the unit by a given pressure, and heating to cure (convert to C-stage) the phenol-formaldehyde resin while the unit is under the given pressure. This reinforced plastic composite exhibits typically high erosion rates and poor temperature strength retention as compared to massive graphites. However, their inherently high initial strength, low thermal conductivity, and good thermal shock resistance permit the fabrication of large complex shapes.

Massive graphite articles are those which are made by mixing a graphitizable furfuryl alcohol resin or pitch with graphite particles and either molding or extruding the same into a unit, curing or polymerizing the binder and then graphitizing the unit. This unit displays high erosion resistance rates and high temperature strength retention when compared to a reinforced plastic composite unit but also exhibits lower initial strength and poor thermal shock resistance which confines its use to small size and simple shapes.

Past attempts at combining the features of massive graphite units and reinforced plastic composites have been made by taking individual layers of B-stage phenol-formaldehyde resin impregnated carbon or graphite cloth and laying one on top of another to form a unit with the phenol-formaldehyde resin acting as a binder or matrix for holding the layers of cloth together.

The phenol-formaldehyde resin binder is then cured and afterwards, depending upon results desired, is either brought to a pyrolyzed, carbonized or graphitized condition resulting in a decrease in bulk density coupled with a corresponding increase in porosity to form a substrate unit which at either of these stages is between 10 percent and 20 percent porous by volume. The substrate is then redensified by filling the voids with phenol-formaldehyde resin, furfuryl alcohol or graphitizable pitch, all in liquid form. When phenolic resin or furfuryl alcohol is used the impregnation takes place at room temperature and when pitch is used, impregnation takes place at a temperature where it is in a liquid state. The redensified substrate is then cured and then, depending upon desired properties, either pyrolyzed, carbonized or graphitized. This redensification cycle is repeated as many times as necessary to either completely fill the voids or partially fill the voids to give the resulting product a given density. Instead of the materials mentioned, the substrate can be redensified with pyrolytic graphite by introducing methane gas at approximately 1,700°F.–2,200°F. resulting in depositing pyrolytic carbon on the substrate and then graphitizing the pyrolytic carbon and/or unit, as the case may be, at about 5,000°F. A well known method of this type of redensification is disclosed by Example 1 of U.S. Pat. No. 3,107,180 issued to Diefendorf. The use of pyrolytic carbon in this structure has the disadvantage of penetrating only from between 50 and 200 mils into the surface of the substrate since due to the compaction of the unit, the pore sizes are such that the pyrolytic carbon deposits close off the outer pores before penetrating deeply into the unit.

The fibrous graphite unit has shown increased erosion resistance over the reinforced plastic composite, but the continued development of high energy propulsion and more sophisticated maneuverable reentry systems have created a need for even better erosion resistance.

It is an object of this invention to provide a fibrous graphite structure which exhibits very high erosion resistance when compared to prior art structures.

It is a further object of this invention to employ a substrate which is very porous for impregnation of a substantial amount of pyrolytic carbon uniformly throughout the thickness of the substrate which is then converted to pyrolytic graphite and results in a product of substantial improvement over prior art products.

The porous substrate precursor can be formed by several different methods. One method is to take plies of B-stage resin impregnated carbon or graphite cloth and stack one on top of another. Another method is by wrapping a continuous tape of B-stage resin impregnated carbon cloth or graphite cloth in the manner as disclosed in either Trimble U.S. Pat. No. 3,402,085 or Trimble U.S. Pat. No. 3,402,091. Still another method is to take plies of carbon or graphite cloth, lay one on top of another and place the same into a container. An A-stage resin is introduced into the container to saturate the unit. The excess resin is then drained from the container. The unit is then compressed to a desired volume and heated to evaporate the solvents and bring the resin to a B-stage condition.

If carbon cloth is used, it must be of at least 80 percent carbon assay. The resins are of thermosetting material, for example: phenol-formaldehyde resin, furfuryl alcohol, furfural, and epoxylated novalac. It is well known in the reinforced plastics industry that these resins are capable of passing upon heating from an A-stage condition wherein the resin is liquid at ambient temperature to a B-stage condition wherein the resin is a thermoplastic solid or a partially gelled liquid of sufficient viscosity to behave as a thermoplastic solid and upon further heating is converted to a C-stage condition wherein the resin is a thermoset solid. Normally, the resin has been brought to the B-stage condition prior to stacking the preimpregnated cloth layers or winding the impregnated tape.

In employing the concept of this invention, the substrate precursor, with the resin at B-stage condition, is debulked by molding at a temperature of between 165°F. and 250°F. under a pressure of about 15 p.s.i.g. – 8,000 p.s.i.g. from 5 minutes to 3 hours to compact the substrate. At this point, the characteristics of the resin have not changed to any noticeable degree and the resin is still in the B-stage condition. The unit is then removed from the mold and placed in an oven and the resin is cured (brought to C-stage) in a free standing state (atmospheric pressure). By curing the resin at atmospheric pressure, expansion of the resin will occur creating substantially more and larger voids than would be normally created by the normal procedure of bringing the resin to the C-stage at the same temperature under pressures of from 15 p.s.i.g. to 10,000 p.s.i.g. prior to carbonizing the same. The degree of resulting porosity is determined or controlled by the temperature and the rate it is applied to the substrate. For instance, the temperature may be brought from ambient to a maximum temperature to be no greater than 450°F. over a period of up to 24 hours and held at such maximum temperature for at least 1 hour to effect conversion of the resin to C-stage.

The degree of porosity can be controlled not only by the temperature and the rate of heat applied to the substrate, but in addition thereto, by limiting the expanded volume of the substrate when curing the resin. Depending upon the configuration of the substrate, the substrate can be placed between two spaced stops if expansion is in one direction only or can be placed inside an over-sized closed mold when expansion is in more than one direction to limit the expansion of the structure thereby controlling the size of the structure and the porosity. The mold or stops are not under any external pressure, but when the structure expands to fill the mold or press against the stops, internal pressure will build up tending either to push apart the stops or to open the mold which is clamped closed. This internal pressure usually will be no greater than about 100 p.s.i.

If the resin is in A-stage when impregnated cloth layers are stacked one upon another or when the impregnated tape is wound, the stacked or wound structure will be heated at atmospheric pressure in an oven at a temperature of from 165°F. to 250°F. for up to 72 hours to bring the resin to B-stage prior to placing the substrate into the mold and debulking under the above given pressures, temperatures, and holding period.

The substrate is then either pyrolyzed, carbonized or graphitized, depending upon desired results. The substrate unit is pyrolyzed by increasing the temperature to a maximum of between 750°F. and 800°F. over a period of 2 hours to 5 days and subjecting the unit to the maximum temperature for a period of from 2 to 20 hours; carbonized by increasing the temperature further to a maximum of either 1,500°F. to 1,800°F. or 3,000°F. to 3,200°F. over a further period of 2 hours to 5 days and subjecting the unit to this maximum temperature for a period of from 2 to 20 hours; and then graphitized by increasing the temperature further to a maximum of from about 4,800°F. to 5,400°F. quite rapidly (depending upon equipment used) and subjecting the unit to this maximum temperature from about 15 to 480 minutes. If the substrate has been allowed to cool to ambient temperature after the resin reaches C-stage, the unit can be either pyrolyzed, carbonized or graphitized by raising the temperature from ambient to the aforementioned temperatures. The porosity of the resulting substrate after pyrolyzation is between 2 to 3 times the 10–20 percent porosity of a substrate made from the same type of precursor by normal techniques. The available porosity to be filled with pyrolytic carbon is at least twice the 5–10 percent available porosity of a substrate made by normal techniques. In any of the pyrolyzed, carbonized or graphitized stages, the substrate can have an available volume porosity of up to 60 percent to be filled with pyrolytic carbon.

The porous substrate unit, made by any of the above methods, is then placed into a chamber and a vacuum pulled on the substrate to evacuate the voids and then the substrate is redensified by infiltrating with methane gas which deposits pyrolytic carbon in the substrate under vacuum at a temperature from about 1,700°F. to 4,200°F. A preferred temperature range for infiltration of this type of substrate is between 1,700°F. and 2,200°F. for a period of about 100 to 200 hours in order to provide a structure with maximum mechanical properties and resistance to thermal shock. This infiltration procedure is standard and can be as descrbied in Example 1 of Diefendorf U.S. Pat. No. 3,107,180. After the deposit of pyrolytic carbon, the unit is then usually baked at temperatures between 5,000°F. and 5,500°F. for a period of 15 to 480 minutes to graphitize the pyrolytic carbon and, if necessary, the resin portion of the unit and the carbon cloth portion. The redensifying procedure may be repeated as often as necessary to obtain the desired density prior to graphitizing the pyrolytic carbon. It should be realized that the time periods given for curing, pyrolyzing, and graphitizing are mainly dependent upon the size of the unit.

The following examples illustrate the invention.

EXAMPLE 1

Plies of B-stage phenol-formaldehyde resin impregnated graphite cloth were compressed together in a normal manner to form a prior art unit and then placed in a mold. The unit was cured (converted to C-stage) by raising the temperature in increments to 310°F. over a period of 10 hours at a pressure of 1,000 p.s.i. The density of the unit was 88.6 lbs./ft.$^3$ and the unit was less than 3 percent porous. The unit was removed from the mold and placed in an oven at atmospheric pressure and then pyrolyzed and carbonized by raising the temperature in increments to 1,500°F. over a 50 hour period. The density of this carbonized unit (substrate unit) was 65 lbs./ft.$^3$, the unit was about 15 percent porous, and the porosity available for infiltration of pyrolytic carbon was 7 percent.

The substrate was then placed in a chamber and methane introduced under vacuum at a temperature of approximately 2000°F. and allowed to infiltrate the substrate unit for 200 hours whereby pyrolyzed carbon was deposited in the voids of the substrate. The binder and pyrolyzed carbon were then graphitized by placing the unit in a furnace and bringing the temperature from room temperature up to 5,100°F. over a period of 8 hours and subjecting the unit to the maximum temperature for about 200 minutes. The density of the outer 50 mils of the unit was about 97 1/2 lbs./ft.$^3$ and the remainder of the unit was about 72 lbs./ft.$^3$.

EXAMPLE 2

A panel substrate was made by taking individual B-stage phenol-formaldehyde resin impregnated carbon cloth (at least 80 percent carbon assay) plies and laying one on top of another and debulking the same by compressing them to form a unit 0.975 inch high. While the unit was being compressed, the unit was subjected to a temperature of 170°F. for a period of 1 hour. At this stage, the density of the unit was 64 lbs./ft.$^3$ and the unit was less than 5 percent porous. The unit was placed in an oven between fixed plates spaced 1⅛ inches apart and then cured in a free standing state (atmospheric pressure) by bringing the temperature to 350°F. and holding at this temperature for a period of 2 hours. The density of this unit was 58 lbs./ft.$^3$ and the unit was about 25 percent porous. The expanded unit was removed from the oven and placed in a carbonizing furnace and pyrolyzed and carbonized by raising the temperature in increments to 1,000°F. and holding at that temperature for an 8 hour period. The density of this carbonized unit (substrate unit) was 54 lbs./ft.³ and the unit was about 33 percent porous.

The substrate was then placed in a chamber and methane introduced under vacuum at a temperature of approximately 1,900°F. and allowed to infiltrate the substrate unit for 240 hours whereby pyrolyzed carbon was deposited in the voids of the substrate. The binder and pyrolyzed carbon was then graphitized by placing the unit in a furnace and bringing the temperature from room temperature up to 5,200°F. over a period of 13 hours and subjecting the unit to the maximum temperature for about 120 minutes. The density of the unit was generally uniform throughout the entire unit and was 89 lbs./ft.³.

EXAMPLE 3

A panel substrate was made by taking individual B-stage phenol-formaldehyde resin impregnated graphite cloth plies and laying one on top of another and debulking the same by compressing them at 1,500 p.s.i. to form a unit. While the unit was being compressed, the unit was subjected to a temperature of 170°F. for a period of 3 hours. At this stage of the process the density of the debulked unit was 91 lbs./ft.³ and the unit was less than 5 percent porous. This substrate was then placed in a stainless steel tank, packed with calcined coke, sealed and placed in a high temperature furnace having an inert atmosphere and cured in a free standing state (atmospheric pressure) bringing the temperature to 300°F. and holding the same for a 2 hour period and then raising the temperature slowly to 1,500°F. to pyrolyze and carbonize the same. The carbonized unit (substrate unit) had expanded by approximately 22.7 percent thus producing a uniformly porous structure which could easily be infiltrated with pyrolytic carbon.

EXAMPLE 4

A panel substrate was made by taking individual B-stage phenol-formaldehyde resin impregnated graphite cloth plies and laying one on top of another and debulking the same by compressing them at about 1,500 p.s.i. to form a unit. While the unit was being compressed, the unit was subjected to a temperature of about 180°F. for a period of 3 hours. At this stage of the process the density of the debulked unit was 91 lbs./ft.³ and the calculated porosity of the unit was about 4.5 percent. This substrate was then placed in a stainless steel tank, packed with calcined coke, sealed and placed in a high temperature furnace having an inert atmosphere and cured in a free standing state (atmospheric pressure) bringing the temperature to 300°F. and holding the same for a 2 hour period and then raising the temperature slowly to 1,500°F. to pyrolyze and then carbonize the same. The density of this carbonized unit (substrate unit) was 56.2 lbs./ft.³ and the calculated porosity of the unit was 36.2 percent.

The substrate was then placed in a chamber and hydrogen diluted methane introduced under vacuum at a temperature of approximately 1,800°F.–2,050°F. and allowed to infiltrate the substrate unit for 360 hours whereby pyrolyzed carbon was deposited in the voids of the substrate. The density of the unit was generally uniform throughout the entire unit and was 69.4 lbs./ft.³. The unit was infiltrated with pyrolytic carbon three more times and after the fourth and final infiltration, the density of the substrate had increased about 64 percent to 88 lbs./ft.³. The binder and pyrolyzed carbon was then graphitized by placing the unit in a furnace and bringing the temperature from room temperature up to 5,100°F. over a period of 8 hours and subjecting the unit to the maximum temperature for about 120 minutes. The final density of the unit increased to 91 lbs./ft.³.

What I claim and desire to protect by Letters Patent is:

1. A process for making a porous substrate unit comprising:
    1. providing a substrate unit comprising plies of B-stage graphitizable resin impregnated cloth having a carbon assay of at least 80 percent;
    2. heating said substrate unit in the absence of external pressure to convert said resin to C-stage, said substrate unit expanding during heating thereby producing a porous substrate unit; and
    3. at least pyrolyzing said porous substrate unit.

2. The process as recited in claim 1 wherein step 2 is carried out by heating the substrate unit from ambient temperature to a maximum temperature of up to 450°F. over a period of 24 hours and maintaining the substrate unit at said maximum temperature for at least 1 hour.

3. The process recited in claim 1 wherein the amount of said expansion of said unit during step 2 is limited by physical means.

4. The process as recited in claim 1 comprising the additional step of:
    4. infiltrating the porous substrate unit with pyrolytic carbon and depositing pyrolytic carbon therein.

5. The process of claim 1 wherein the porous substrate unit is carbonized.

6. The process of claim 1 wherein the porous substrate unit is graphitized.

7. The process of claim 4 further comprising graphitizing at least the pyrolytic carbon.

8. The process of claim 1 in which the substrate unit of step 2 is heated in a free-standing state at atmospheric pressure.

9. The process of claim 8 comprising the additional step of:
    4. infiltrating the porous substrate unit with pyrolytic carbon and depositing pyrolytic carbon therein.

10. The process of claim 8 wherein said porous substrate unit is carbonized.

11. The process of claim 8 wherein said porous substrate unit is graphitized.

* * * * *